(12) United States Patent
Ebergen et al.

(10) Patent No.: US 7,429,884 B2
(45) Date of Patent: Sep. 30, 2008

(54) PULSE-SIGNALING CIRCUITS FOR NETWORKS ON CHIP

(75) Inventors: Jo C. Ebergen, San Francisco, CA (US); Stephen B. Furber, Wilmslow (GB)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/521,031

(22) Filed: Sep. 14, 2006

(65) Prior Publication Data

US 2007/0115040 A1    May 24, 2007

Related U.S. Application Data

(60) Provisional application No. 60/738,245, filed on Nov. 18, 2005.

(51) Int. Cl.
*G06F 1/04* (2006.01)

(52) U.S. Cl. ..................... 327/291; 327/112

(58) Field of Classification Search .............. None
See application file for complete search history.

(56) References Cited

U.S. PATENT DOCUMENTS

| | | | | |
|---|---|---|---|---|
| 4,767,947 A * | 8/1988 | Shah | ................ | 327/176 |
| 5,467,037 A * | 11/1995 | Kumar et al. | ................ | 327/142 |
| 5,550,490 A * | 8/1996 | Durham et al. | ................ | 326/98 |
| 5,986,475 A * | 11/1999 | Kim et al. | ................ | 326/95 |
| 6,275,069 B1 * | 8/2001 | Chung et al. | ................ | 326/98 |
| 7,205,814 B2 * | 4/2007 | Park | ................ | 327/291 |
| 2002/0097071 A1 * | 7/2002 | Confalonieri et al. | ........ | 327/108 |
| 2004/0051567 A1 * | 3/2004 | Kim | ................ | 327/112 |

OTHER PUBLICATIONS

Publication: "Chain: A Delay-Insensitive Chip Area Interconnect" by John Bainbridge and Steve Furber, Sep.-Oct. 2002, IEEE, 0272-1732/02, pp. 16-23.

* cited by examiner

*Primary Examiner*—Cassandra Cox
(74) *Attorney, Agent, or Firm*—Park, Vaughan & Fleming, LLP

(57) ABSTRACT

A pulse circuit contains an input stage configured to receive input pulses on input nodes using push-pull elements, wherein a given push-pull element is configured to receive an input pulse on a given input node and to provide a corresponding internal signal. The pulse circuit further contains a feedback loop that includes a logic element coupled between outputs from the push-pull elements and reset nodes of the push-pull elements. This logic element is configured to provide one or more outputs from the pulse circuit and to reset the internal signals from the push-pull elements via the feedback loop.

18 Claims, 13 Drawing Sheets

PULSE-SIGNALING CIRCUITS FOR NETWORKS ON CHIP

CROSS REFERENCE TO RELATED APPLICATIONS

This application hereby claims priority under 35 U.S.C. § 119 to U.S. Provisional Patent Application No. 60/738,245, filed on 18 Nov. 2005, entitled "Taking Pulse," by inventors Jo C. Ebergen and Stephen B. Furber, the contents of which is hereby incorporated by reference.

BACKGROUND

1. Field of the Invention

The present invention relates to techniques for communicating signals between electronic circuits. More specifically, the present invention relates to circuits and methods for asynchronous communication using pulse signals.

2. Related Art

Two common signaling techniques in asynchronous circuit design are "transition signaling" and "level signaling." In transition signaling, primitive components communicate using voltage transitions. During a given communications cycle, a 2-phase protocol is utilized, in which one phase is the request phase and the other phase is the acknowledge phase. Examples of primitive components used in transition signaling include the Merge element, the Muller C-element, and the Decision-Wait element.

In level signaling, primitive components communicate using voltage levels. During a given communications cycle, a 4-phase protocol is utilized, including a first request and acknowledge phase for the rising transitions and then another request and acknowledge phase for the falling transitions. Thus, after the fourth phase the primitive components return to their initial state. As a consequence, level signaling is also referred to as return-to-zero signaling and transition signaling is called non-return-to-zero signaling. Typically, the use of level signaling results in simpler circuits at the cost of four phases per communications cycle, while transition signaling only has two phases per communication cycle at the cost of more complex circuits.

Recently, pulse-mode circuits, such as asynchronous symmetric pulse protocol (GasP), asynchronous pulse logic (APL), and single-track full-buffer (STFB), have been proposed. In these circuit families, components are connected using tri-state wires. In the floating state, these tri-state wires weakly maintain their state with keepers. However, such tri-state wires are susceptible to noise, in particular via capacitive coupling on the wires. Often these noise-sensitive wires are also driven by a single pull-down or pull-up stack of transistors that have smaller noise margins than static gates.

Therefore, implementations that utilize existing asynchronous signaling techniques often involve considerable circuit area, power consumption, and expense. Hence, what is needed is a method and an apparatus that facilitates asynchronous signaling without the problems listed above.

SUMMARY

One embodiment of the present invention provides a pulse circuit that contains an input stage configured to receive input pulses on input nodes using push-pull elements, wherein a given push-pull element is configured to receive an input pulse on a given input node and to provide a corresponding internal signal. The pulse circuit further contains a feedback loop that includes a logic element coupled between outputs from the push-pull elements and reset nodes of the push-pull elements. This logic element is configured to provide one or more outputs from the pulse circuit and to reset the internal signals from the push-pull elements via the feedback loop.

In some embodiments, the pulse circuit further includes keeper circuits coupled to the push-pull elements, wherein a given keeper circuit maintains the internal signal from the given push-pull element. Note that the given push-pull element may include a PMOS transistor and an NMOS transistor.

In some embodiments, a delay associated with the feedback loop and one of the push-pull elements has a pre-determined value, which is at least as large as a width of the input pulses. This feedback loop may further include an inverter and/or additional cascaded logic elements.

The input stage may be configured to receive the input pulses on the input nodes at different times. Furthermore, a minimum time separation between successive input pulses on the given input node is at least as large as twice a pre-determined delay. In some embodiments, the input pulses may include negative pulses.

In some embodiments, the pulse circuit further includes a configuration circuit configured to initialize the internal signals from the push-pull elements. And in some embodiments, the pulse circuit further includes a pulse-to-transition converter circuit coupled to the logic element.

The pulse circuit may be configured to implement on-chip asynchronous pulse signaling. Furthermore, in some embodiments the pulse circuit is included in a pipeline circuit, an arithmetic logic circuit, and/or a switching circuit.

In some embodiments, the input nodes include a control node and two signal nodes, where the input stage is configured to receive a control input pulse on the control node and a signal input pulse on either of the two signal nodes. In these embodiments, the input stage is configured to receive the control input pulse and the signal input pulse at different times.

In some embodiments, the pulse circuit may be included in an integrated circuit in a computer system.

Another embodiment of the present invention provides a method for pulse signaling in which input pulses are received on input nodes and internal signals are provided, wherein a given internal signal corresponds to an input pulse on a give input node. A feedback signal is generated based on the internal signals and the internal signals are reset based on the feedback signal. Furthermore, an output corresponding to the input pulses is provided.

BRIEF DESCRIPTION OF THE FIGURES

Note that like reference numerals refer to corresponding parts throughout the drawings.

DETAILED DESCRIPTION

Figure 1A:
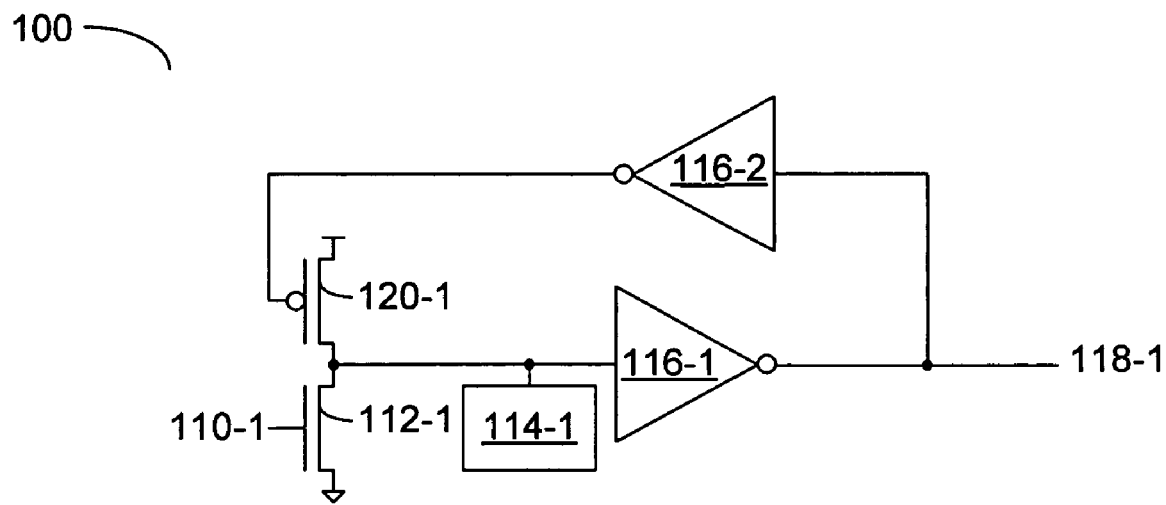
FIG. 1A is a block diagram illustrating an embodiment of a pulse repeater circuit.
Figure 1B:
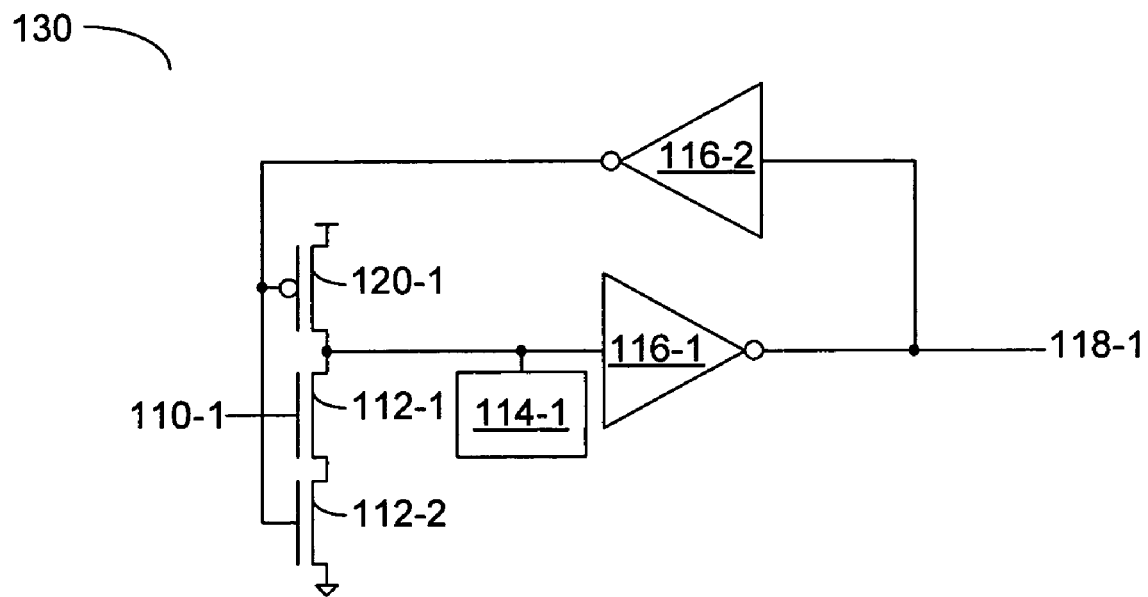
FIG. 1B is a block diagram illustrating an embodiment of a pulse repeater circuit.
Figure 1C:
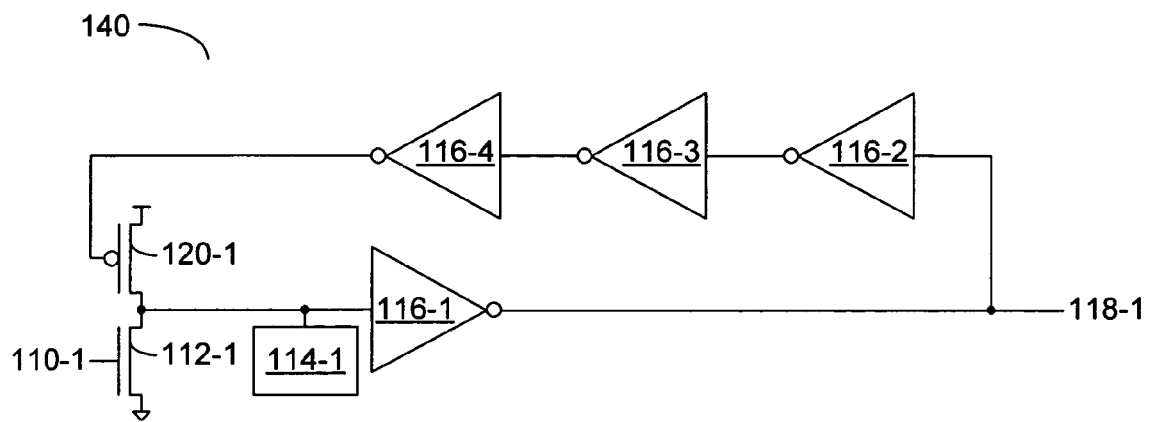
FIG. 1C is a block diagram illustrating an embodiment of a pulse repeater circuit.
Figure 1D:
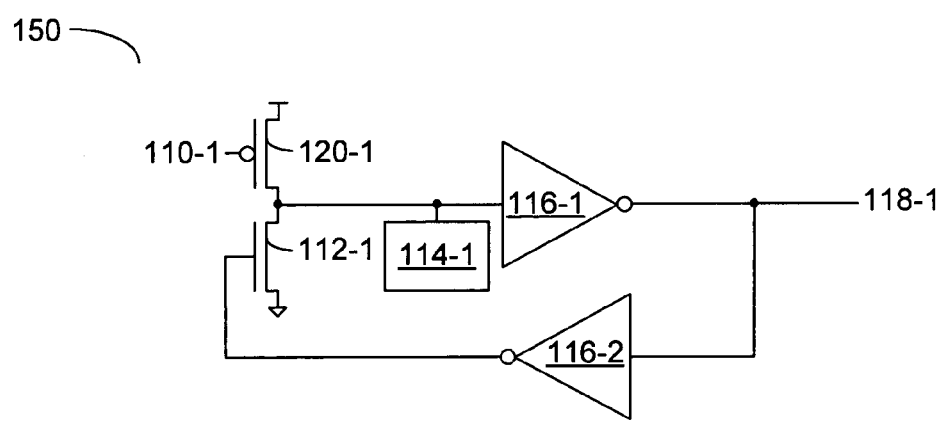
FIG. 1D is a block diagram illustrating an embodiment of a pulse repeater circuit.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a method, circuits, and systems that include one or more of the circuits are described. The circuits implement asynchronous communication utilizing pulse signals, and include primitive pulse components such as repeater circuits, Merge circuits, C-element circuits, Decision-Wait circuits, and/or arbiter circuits (which arbitrate between a number of events, such as input pulses, that arrive at the same time). These circuits may include point-to-point and/or point-to-multipoint communication, and may include pulse signals on one or more signal lines or wires that have been encoded. Furthermore, networks that include these circuits may have a 2-phase protocol during a given communication cycle, including a transmit phase and an acknowledgement phase. Such networks may be included in integrated circuits on semiconductor dies, thereby enabling on-chip or intra-chip communication.

A given pulse circuit includes an input stage to receive input pulses on input nodes using push-pull elements (such as PMOS and NMOS transistors) and to provide internal signals. These internal signals may be stored or maintained by keeper circuits. A feedback loop in the given pulse circuit includes a logic element coupled between outputs from the push-pull elements and reset nodes of the push-pull elements. This logic element determines a feedback signal based on the internal signals, resets the internal signals from the push-pull elements based on the feedback signal, and provides one or more outputs from the pulse circuit. Note that the delay associated with the feedback loop and one of the push-pull elements has a pre-determined value, which may be at least as large as a width of the input pulses. Also note that the input stage may be configured to receive the input pulses on the input nodes at different times.

By continuously driving the wires or signals lines that couple these circuits, noise immunity is improved. In addition, the use of pulse-mode signaling offers implementations that have smaller sizes, lower cost, reduced delay, and/or reduced power consumption.

These circuits may be included in a variety of applications, including pipeline circuits, arithmetic logic circuits (such as AND, NOR, inverter, and/or adder circuits), and/or switching circuits (including a crossbar switch, as well as a hub, a bridge, and/or a router). Furthermore, these circuits may be included in integrated circuits that may be used in a variety of systems, such as networks and/or computer systems (including multi-processor computer systems). For example, the integrated circuit may be included in a backplane that is coupled to multiple processor blades.

We now describe embodiments of a pulse circuit for asynchronous communication. FIGS. 1A-1D present block diagrams illustrating embodiments of a pulse repeater circuit. This circuit provides the identity gate for pulse signals. In embodiment 100, a positive pulse having a fixed width (or an approximately fixed width) is received on an input node 110-1. NMOS transistor 112-1 in an input stage converts the positive input pulse to a low voltage level on an internal node. Once the internal node is low, a reset or feedback loop starts. The feedback loop contains two inverters 116 and drives a PMOS transistor 120-1 in the input stage. Note that the NMOS transistor 112-1 and the PMOS transistor 120-1 are therefore examples of push-pull elements in the input stage. The inverters 116 and the PMOS transistor 120-1 are each carefully sized such that the delay of the feedback loop and the PMOS transistor 120-1 (henceforth referred to as the loop delay) is fixed and has a minimum value. In an exemplary embodiment, the delay associated with each gate is equal. In this case, the loop delay is therefore three gate delays. In other embodiments, however, the delays associated with at least some of the gates have different values.

Thus, the PMOS transistor 120-1 drives the internal node high three gate delays after the NMOS transistor 112-1 drives the internal node low. In order to avoid any fighting, the input pulse has a width at most equal to the loop delay, but also wide enough to drive the internal node low. Note that this design constraint may, at least in part, determine the minimum value of the loop delay. In this way, the NMOS transistor 112-1 stops driving before the PMOS transistor 120-1 starts driving. In the preceding exemplary embodiment, the PMOS transistor 120-1 drives the internal node high for only three gate delays due to the loop delay of three gate delays. More generally, the PMOS transistor 120-1 drives the internal node high for a time equal to the loop delay.

In some embodiments, a keeper 114-1 maintains the internal node high after the PMOS transistor 120-1 stops driving the internal node. When the internal node goes high, the pulse repeater produces the trailing edge of the pulse at output node 118-1. In an exemplary embodiment, the keeper 114-1 may be implemented using two crossed, weakly coupled inverters. Note that the output node 118-1 in embodiment 100, and in the embodiments of the other pulse circuits described below, is actively driven, thereby improving noise immunity.

If the input pulse becomes significantly longer than the loop delay, significant fights may occur between the PMOS (pull-up) transistor 120-1 and the NMOS (pull-down) transistor 112-1. One technique for addressing such fights is provided in embodiment 130, which illustrates an implementation that is more robust against input pulses that are too wide at the cost of an extra NMOS transistor 112-2 in the input stage.

The loop delay determines the width of the output pulse. For a loop delay of three gate delays, the pulse width will be three gate delays, and for a loop delay of five gate delays, the pulse width will be five gate delays. Larger loop delay values are possible (for example, by adding inverters in the feedback loop) and may be useful in embodiments with long wires or signal line connections between pulse circuits. Unless otherwise noted, for convenience the pulse width in embodiments 100 and 130, and in the embodiments below, have a pulse width of three gate delays.

Note that pulses having a width of five or more gate delays may be more robust to load variations and may deteriorate less in long wires than pulses with widths of three gate delays. Embodiment 140 provides a pulse repeater that produces output pulses having a width of five gate delays. In a variation on this embodiment, the output node 118-1 from the pulse repeater may be placed after inverter 116-3 in the feedback loop.

In addition to pulse repeaters that receive and produce positive pulses, there are also pulse repeaters that receive and produce negative pulses. Embodiment 150 provides an example of such a pulse repeater.

The circuits in embodiments 100, 130, 140, 150, and the embodiments described below, may include fewer components or additional components. For example, there may be additional inverters 116 in the feedback loop, or there may be additional push-pull elements in the input stage to improve performance (as illustrated in embodiment 130) or to receive both positive and negative pulses (as opposed to the uni-polar examples illustrated above). Furthermore, two or more components may be combined into a single component, and the position of one or more components may be changed.

Figure 2A:
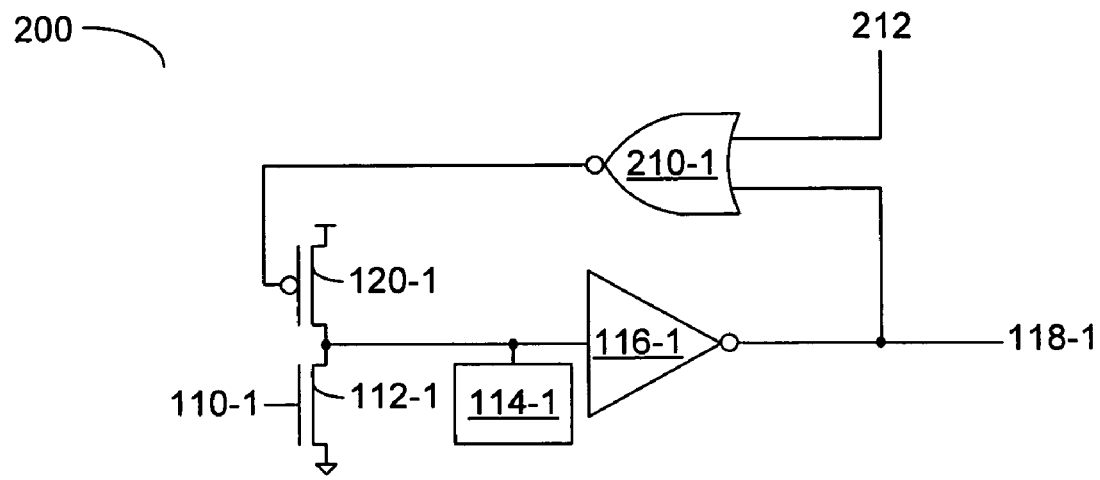
FIG. 2A is a block diagram illustrating an embodiment of a pulse circuit that includes an initialization mechanism.
Figure 2B:
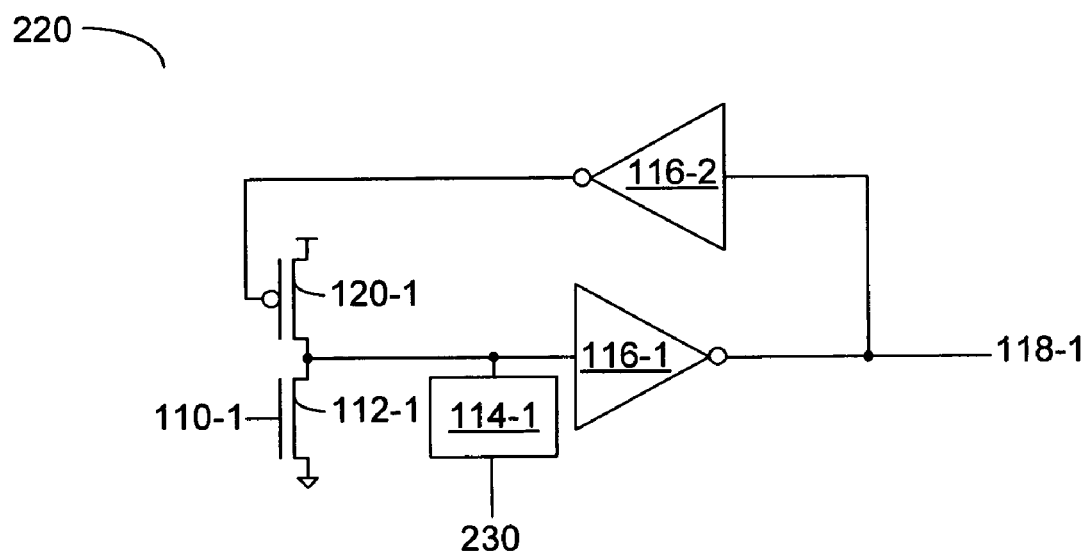
FIG. 2B is a block diagram illustrating an embodiment of a pulse circuit that includes an initialization mechanism.

The internal node in pulse repeaters, and in general pulse circuits, is often initialized. For example, for a positive pulse repeater (i.e., for a pulse repeater that is configured to receive a positive pulse) the internal node is initialized high. FIGS. 2A and 2B provide block diagrams illustrating embodiments of pulse repeater circuits that include initialization mechanisms. In embodiment 200, the internal node is pre-charged indirectly through a NOR gate 210-1 in the feedback loop based on a signal on a configuration node 212. And in embodiment 220, the internal node is pre-charged through the keeper 114-1 based on a signal on the configuration node 230. For example, a PMOS transistor (not shown) may drive the configuration node 230. Alternatively, an inverter in the keeper 114-1 may be replaced by a NAND or a NOR gate that is controlled by the signal on the configuration node 230. Similar initialization techniques may be applied to modules or circuits operating on negative pulses, as well as the pulse circuit embodiments described below.

In addition to the pulse repeater there are a number of other pulse modules or circuits that realize different functions, such as the pulse Merge (described with reference to FIG. 3), the pulse C-element (described with reference to FIGS. 4A-4C), and the pulse Decision-Wait (described with reference to FIGS. 5A-5C). While these additional pulse circuits are more complicated in behavior than the pulse repeater, the various modules share some common principles. In particular, upon receipt of a number of input pulses, a given pulse circuit produces an output pulse. Subsequently, a new set of input pulses may be provided to the circuit and the behavior may be repeated. Furthermore, a set of pulse circuits (a pulse circuit family), combinations of which may be used in a network, each have loop delays having a common value.

To ensure correct operation of networks of pulse circuits, there are a few systems constraints or conditions. In particular, all input and output pulses have about the same width (W). In other words, as noted above the loop delays in the implementations of the pulse circuits have about the same value. A common pulse width may be obtained by automatically sizing gates or by using feedback loops that include five or more gates. This equality among pulse widths may avoid any significant fights between the pull-up and pull-down transistors in the input stage in the implementation of a given pulse circuit. In case input pulses become wider than W, but smaller than 2W, more robust implementations, such as that illustrated in embodiment 130 (FIG. 1B), may be used. Note that all of the embodiments of the pulse circuits will restore the width of output pulses even if input pulses deviate from the standard width (so long as the deviation is not too large). The range of accommodation is determined, at least in part, by the number of gates (such as the number of inverters) in the feedback loop.

Furthermore, the minimum time interval separating two input pulses on a given input node is at least 2W, where the time interval is measured from a leading edge of a current pulse to a leading edge of a subsequent input pulse. This condition implies that the minimum cycle time for each pulse circuit is at least 2W. As with the condition in the preceding paragraph, this condition also ensures the absence of significant fights between the pull-up and pull-down transistors.

Figure 3:
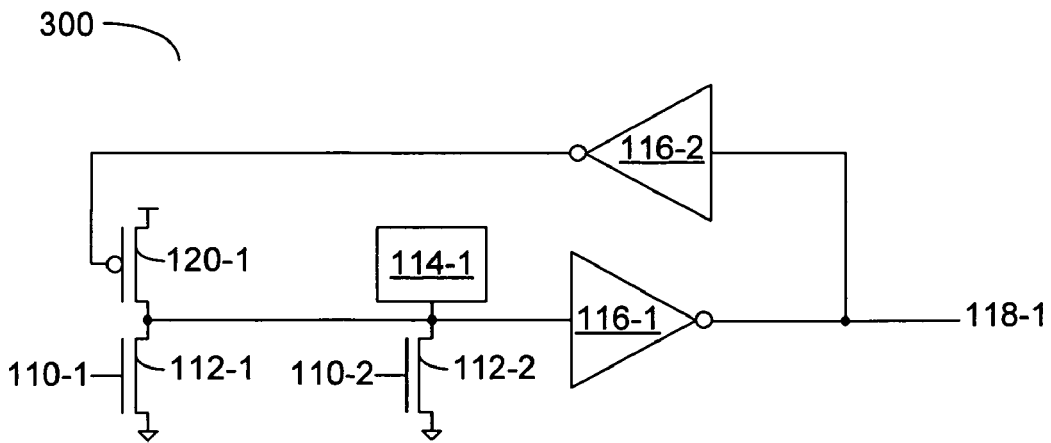
FIG. 3 is a block diagram illustrating an embodiment of a pulse Merge circuit.

We now describe additional pulse circuits in a set of primitive pulse elements that implement different functions than the pulse repeater. FIG. 3 provides a block diagram illustrating an embodiment 300 of a pulse Merge circuit, which is a generalization of a pulse repeater. The pulse Merge receives an input pulse on either input node 110-1 or input node 110-2 and produces an output pulse on the output node 118-1. The behavior then repeats when a subsequent input pulse is received on one of the input nodes 110. Note that the environment may not provide two pulses concurrently to the pulse Merge, either on the same input node or on different inputs, before an output pulse is provided by the pulse Merge.

Figure 4A:
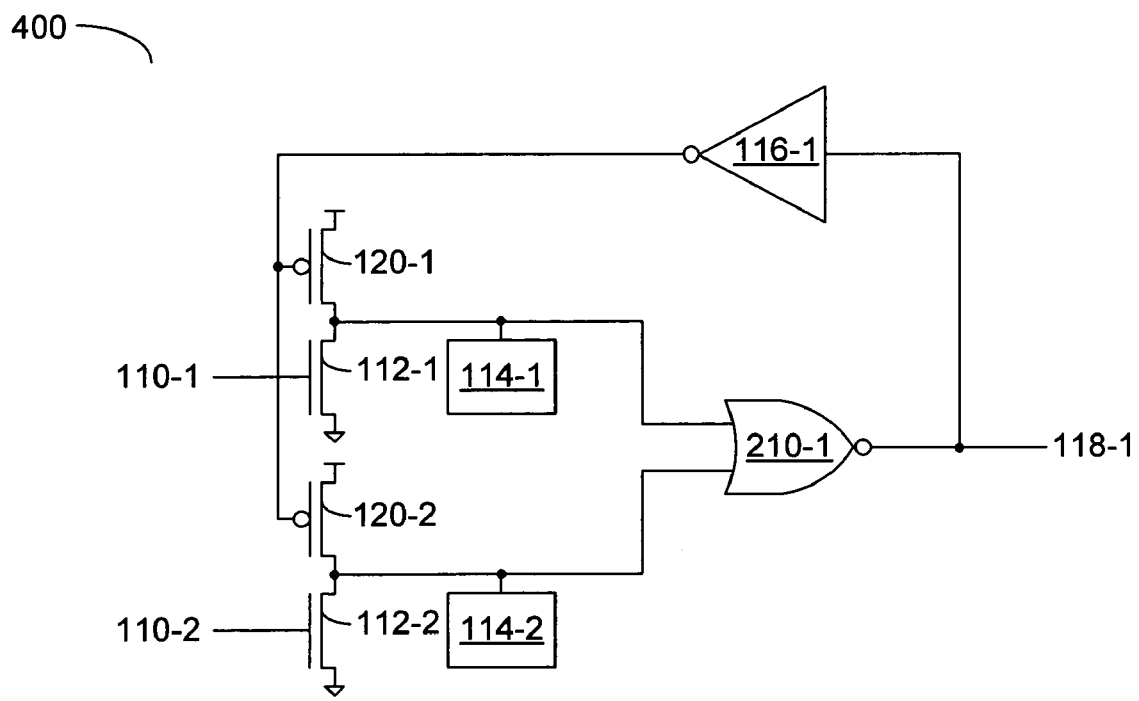
FIG. 4A is a block diagram illustrating an embodiment of a pulse C-element circuit.
Figure 4B:
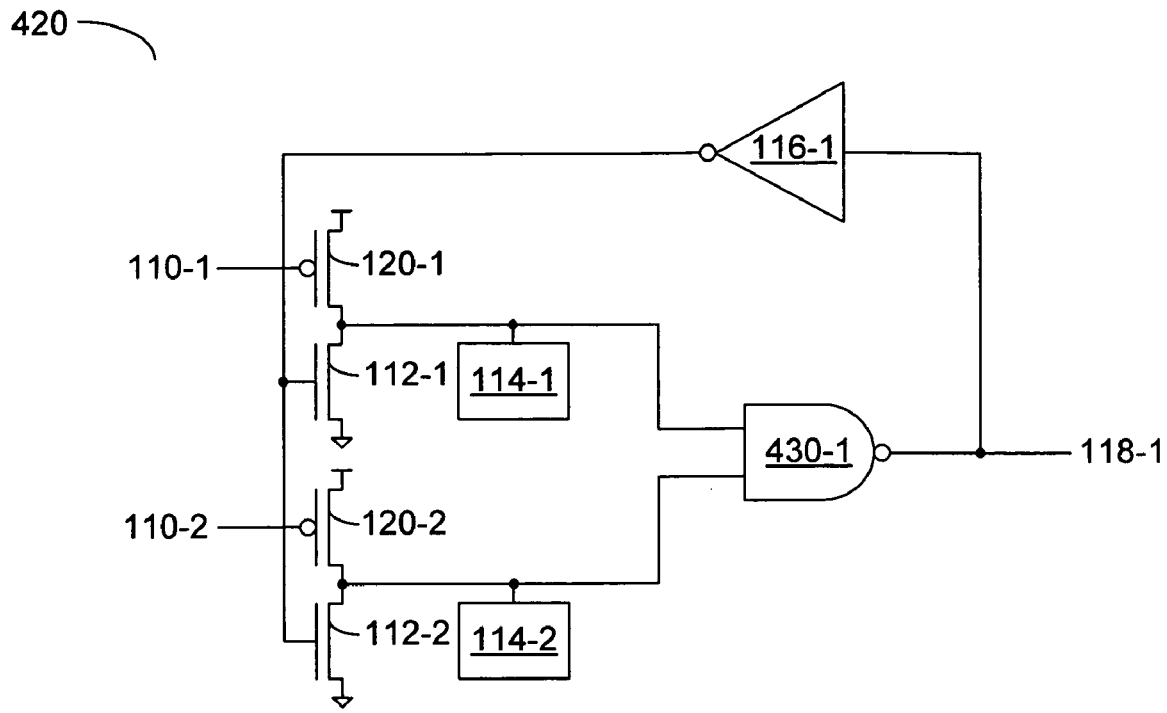
FIG. 4B is a block diagram illustrating an embodiment of a pulse C-element circuit.
Figure 4C:
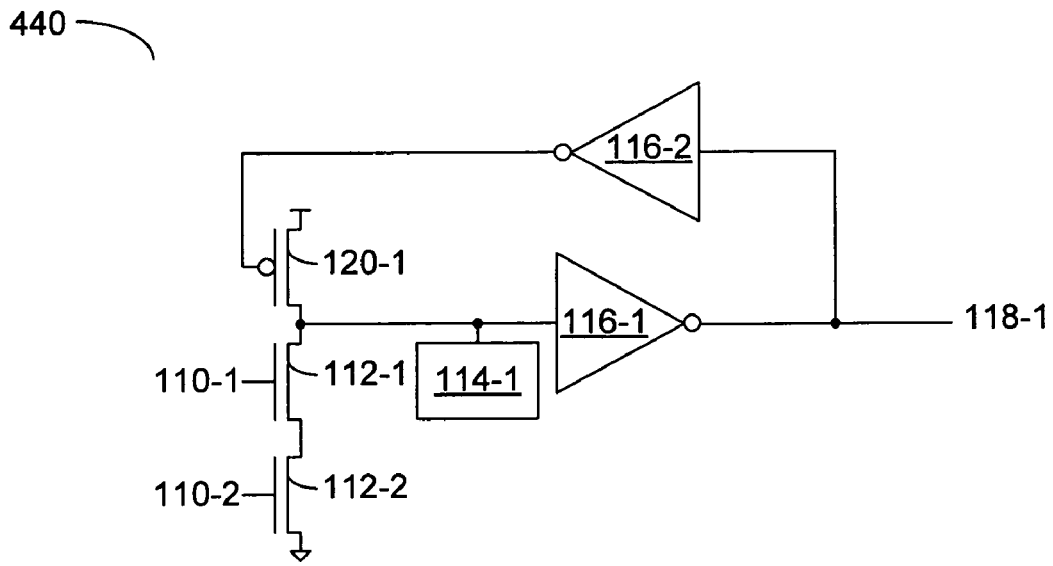
FIG. 4C is a block diagram illustrating an incorrect embodiment of a pulse C-element circuit.

FIGS. 4A-4C provide block diagrams illustrating embodiments of a pulse C-element circuit. Embodiment 400 illustrates an implementation of the pulse C-element in which an output pulse is produced on the output node 118-1 after input pulses are received on input nodes 110-1 and 110-2. In particular, the NOR gate 210-1 produces the leading edge of the output pulse after both internal nodes have become low. The feedback loop then resets the internal nodes high concurrently and finally produces the trailing edge of the output pulse. The behavior of the C-element then repeats when subsequent pairs of input pulses are received on the input nodes 110.

Note that since both inputs to the NOR gate 210-1 go high concurrently, a transistor implementation can exploit this by halving the drive strength of the NMOS transistors in the NOR gate 210-1. This reduces the logical efforts of the inputs and outputs of the NOR gate 210-1 and renders a more energy-efficient implementation. Also note that the pulse C-element produces the output pulse only after the input pulses have been received on both input nodes 110 and that these input pulses may arrive at arbitrary times. However, the environment of the C-element circuit may provide input pulses on both input nodes 110 initially and after each output pulse on the output node 118-1. The environment may not provide two input pulses in a row on any of the input nodes 110 before an output pulse is produced. The minimum time separation between two input pulses on the given input node (measured from the leading edge of a current input pulse to the leading of a subsequent input pulse) is at least as large as twice the loop delay.

Embodiment 420 illustrates an implementation of the pulse C-element for negative pulses in which NAND gate 430-1 performs the logic function in the feedback loop. And embodiment 440 illustrates an erroneous implementation of a pulse C-element. This implementation fails because the input pulses may arrive at very different times. As a consequence, the internal node may not be consistently pulled low by the NMOS transistors 112 in the input stage.

Figure 5A:
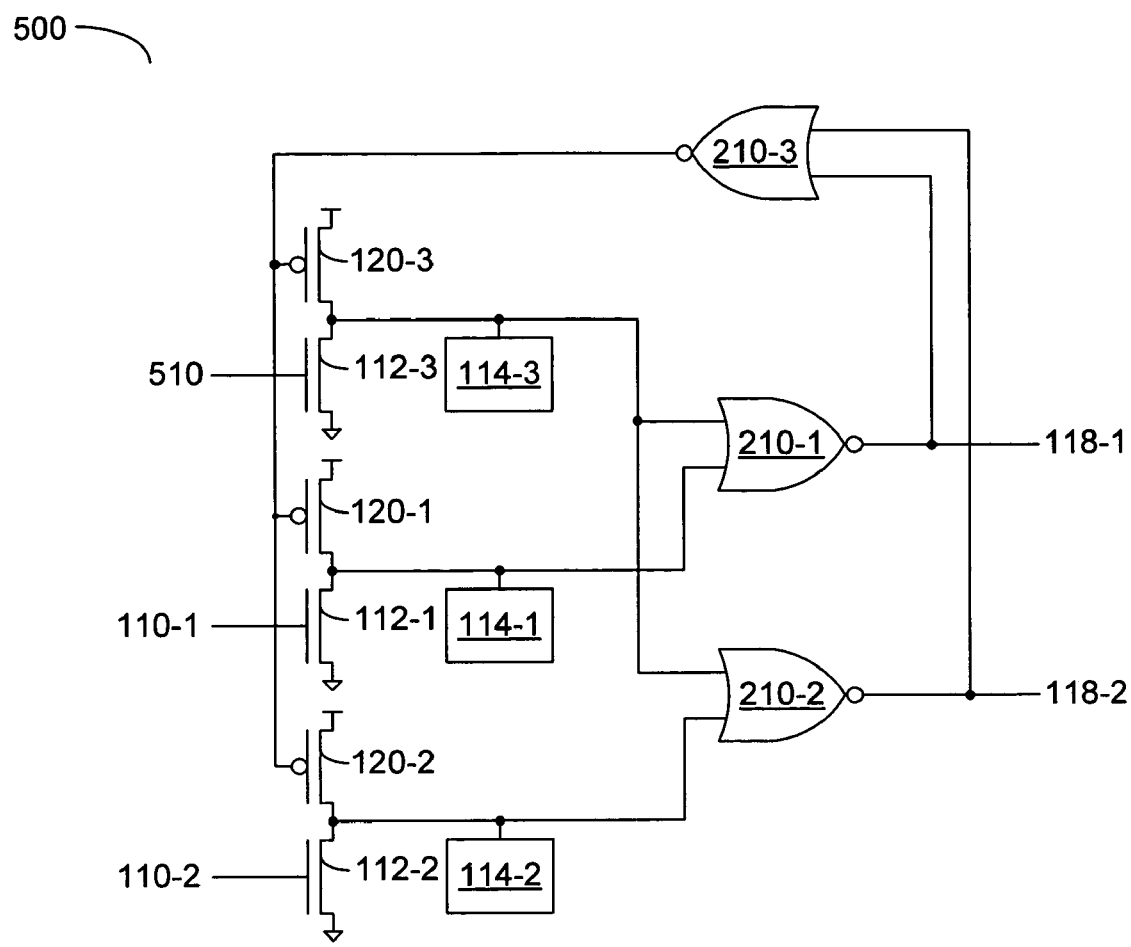
FIG. 5A is a block diagram illustrating an embodiment of a pulse Decision-Wait circuit.
Figure 5B:
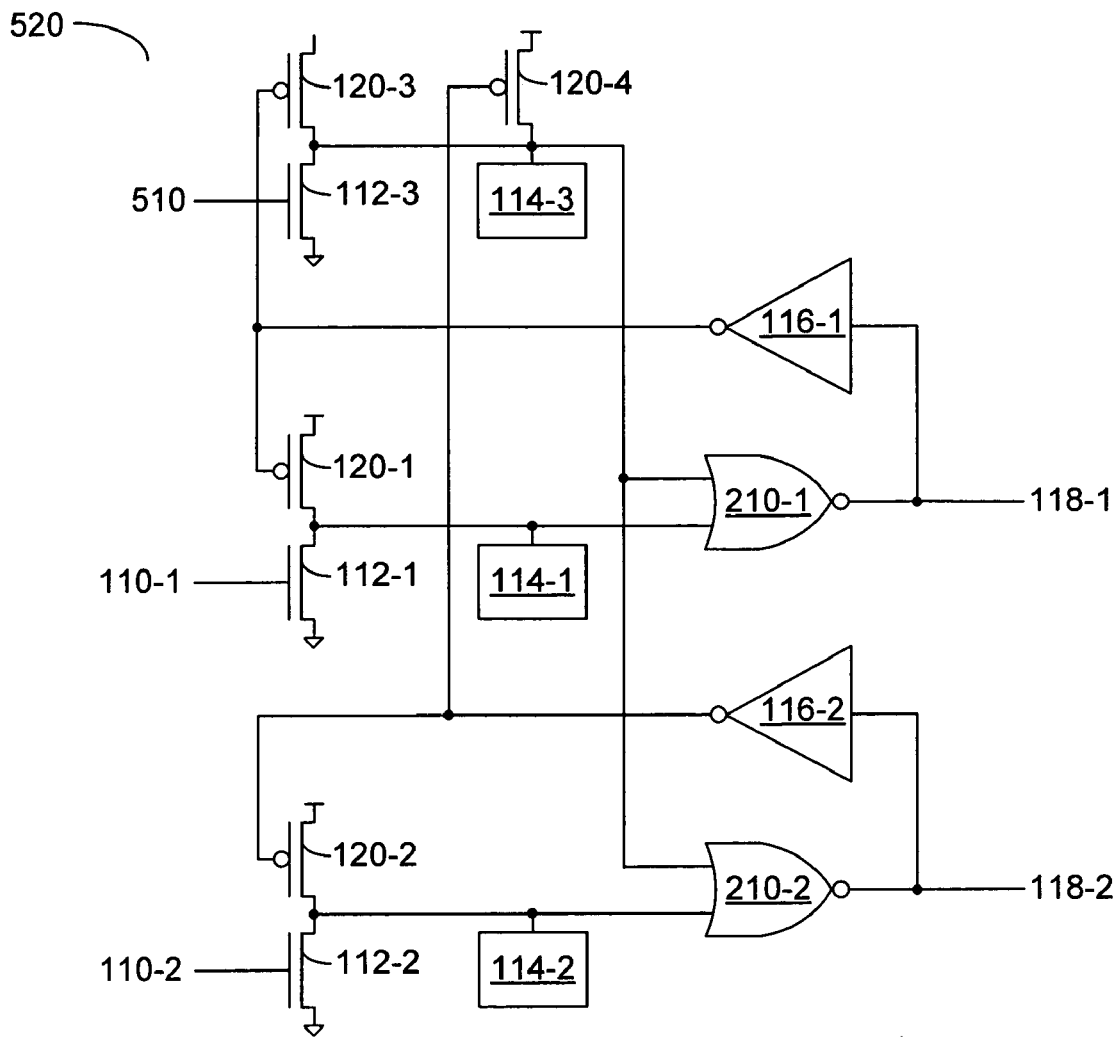
FIG. 5B is a block diagram illustrating an alternate embodiment of a pulse Decision-Wait circuit.
Figure 5C:
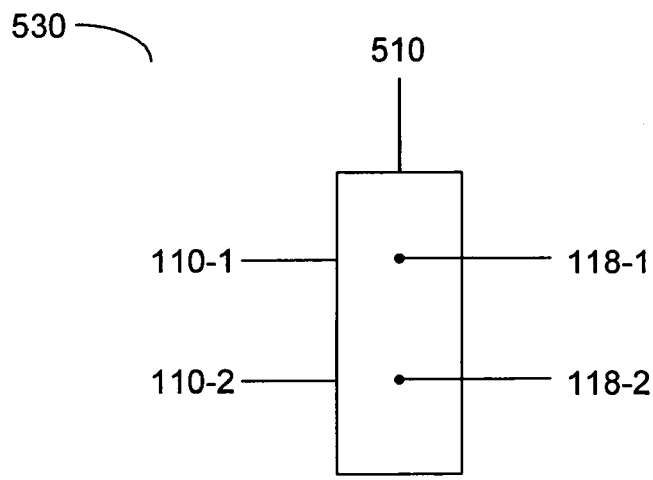
FIG. 5C is a block diagram illustrating an embodiment of a circuit symbol that represents a pulse Decision-Wait circuit.

FIGS. 5A-5C are block diagrams illustrating embodiments of a pulse Decision-Wait circuit, which is a generalization of a C-element. Embodiment 500 is a 2-by-1 pulse Decision-Wait circuit in which a positive input pulse is received on input node 510 (a control node) and a positive input pulse is received on either input node 110-1 or input node 110-2. When the Decision-Wait receives a pulse on input nodes 110-1 and 510, it produces an output pulse on output node 118-1, and when the Decision-Wait receives a pulse on input nodes 110-2 and 510, it produces an output pulse on output node 118-2. After producing an output pulse on output nodes 118-1 or 118-2, the environment may provide a new set of input pulses to the pulse Decision-Wait circuit.

Embodiment 520 illustrates an alternative implementation for positive pulses. While not shown here, negative pulse implementations follow straightforwardly from embodiments 500 and 520. Positive and/or negative pulse implementations may be generalized to n-by-1 Decision-Waits, and even n-by-m Decision-Waits. An n-by-m Decision-Wait has one set of n input nodes, another set of m input nodes, and a set of n×m output nodes, with one output node for each combination of two input nodes. During a given cycle, such an n-by-m Decision-Wait receives an input pulse on only one input node in its set of n input nodes and an input pulse on only one input node in its set of m input nodes. It then produces an output pulse on the appropriate output node. Implementations of n-by-m Decision-Waits follow straightforwardly from the implementations of the 2-by-1 Decision-Wait in embodiments 500 and 520, and may include additional cascaded logic elements in the feedback loop.

In order to abstract from the implementation details of a Decision-Wait element, a Decision element may be represented by a circuit symbol. FIG. 5C provides a block diagram that illustrates an embodiment 530 of a circuit symbol that represents a 2-by-1 pulse Decision-Wait circuit that corresponds to the implementations in embodiments 500 and 520.

The elementary pulse circuits described above may be utilized in a variety of applications. A pipeline is considered as an illustrative example.

Figure 6A:
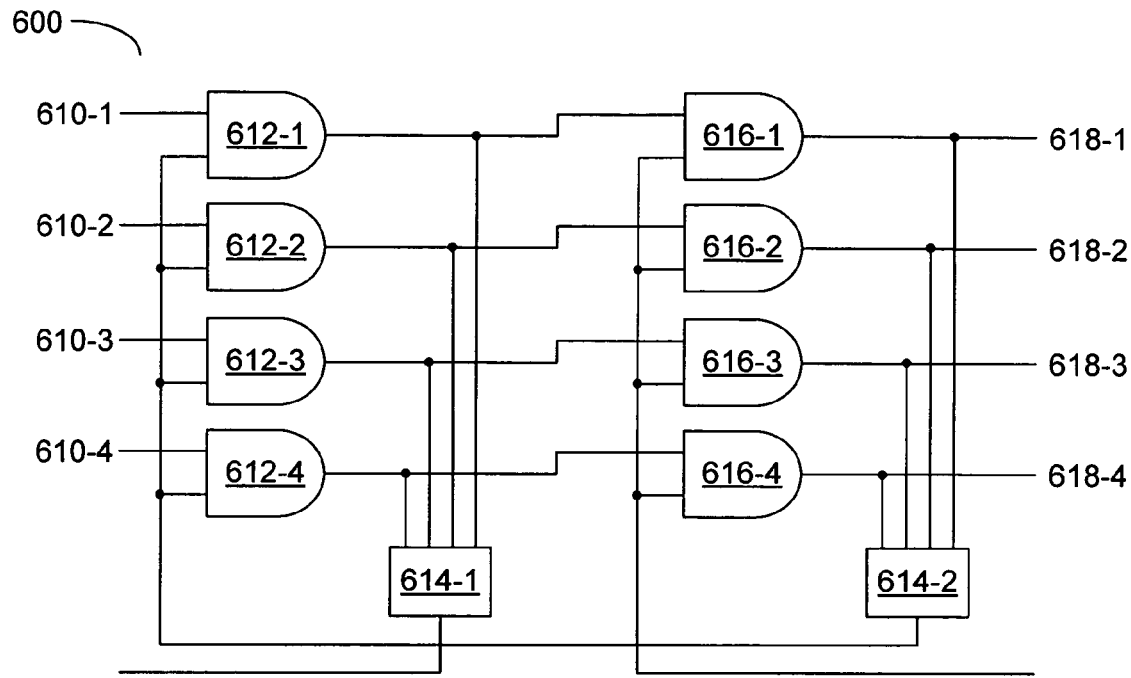
FIG. 6A is a block diagram illustrating an embodiment of an existing pipeline stage that includes transition circuits and a 4-phase protocol.

FIG. 6A provides a block diagram illustrating an embodiment 600 of an existing pipeline stage that includes C-element circuits 612 and 616 and Merge circuits 614. These circuits utilize transition signaling and a 4-phase protocol. Furthermore, in embodiment 600 1-out-of-4 encoding is used on inputs 610 and outputs 618 to communicate 2 bits, i.e., a transition signal communicated on one wire encodes for one value out of four. In order to transfer one data item through the pipeline, a cycle utilizing two C-elements (such as C-elements 612-1 and 616-1) and one Merge (such as Merge 614-2) has to be executed twice, once for a rising transition and once for a falling transition.

Figure 6B:
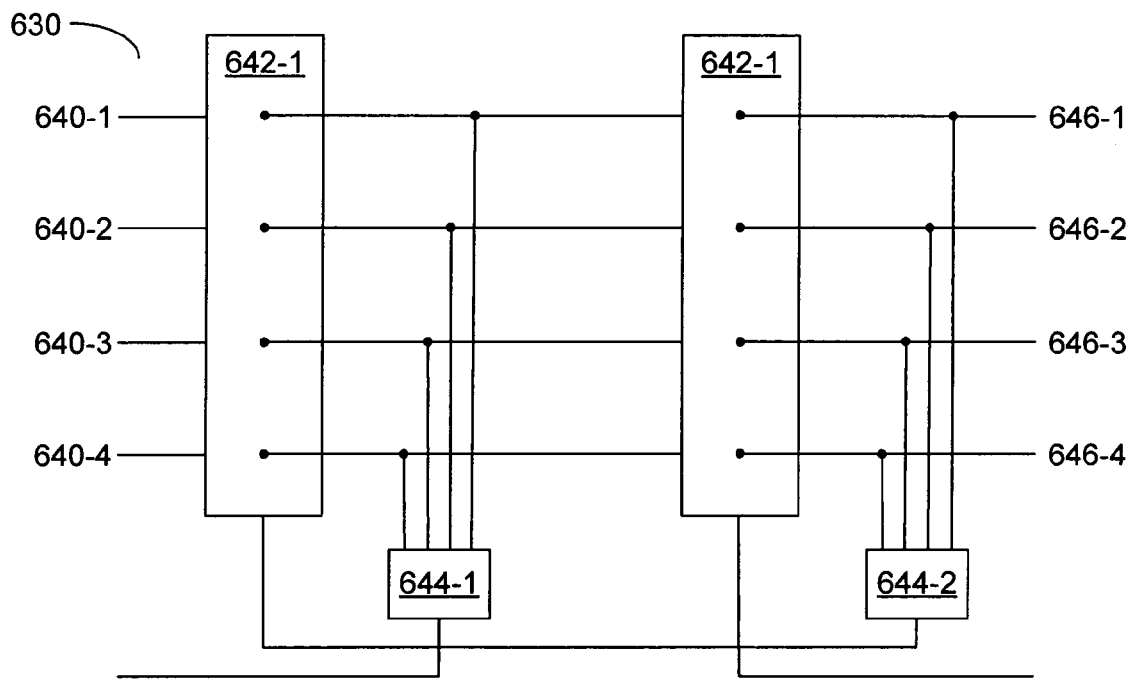
FIG. 6B is a block diagram illustrating an embodiment of a pipeline stage that include pulse circuits and a 2-phase protocol.
Figure 7A:
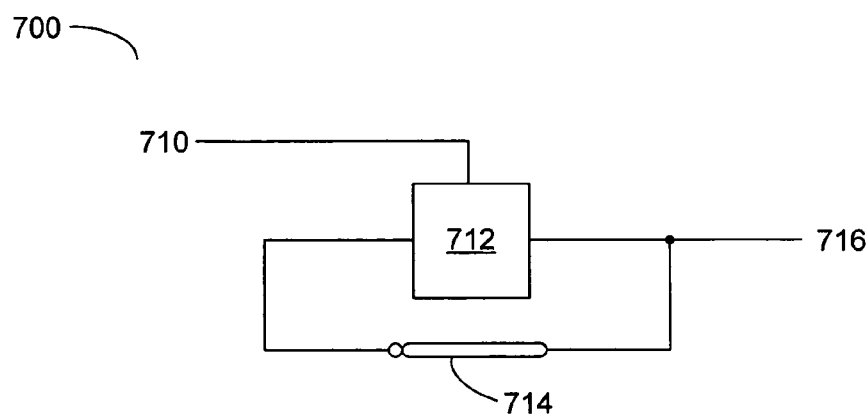
FIG. 7A is a block diagram illustrating an embodiment of a circuit that converts between pulse signals and transition signals.
Figure 7B:
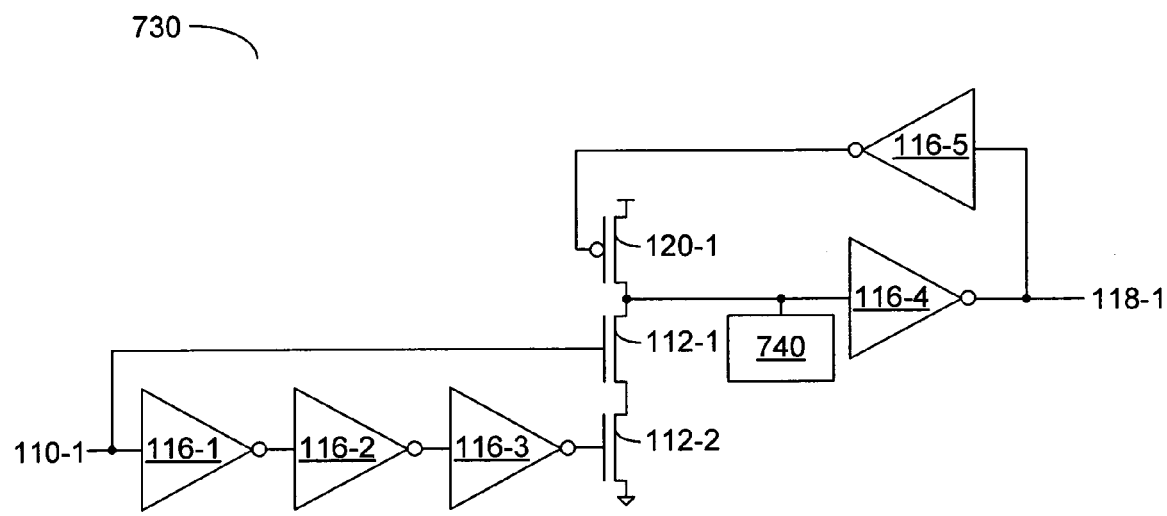
FIG. 7B is a block diagram illustrating an embodiment of a circuit that converts between rising transition signals and positive pulse signals.
Figure 7C:
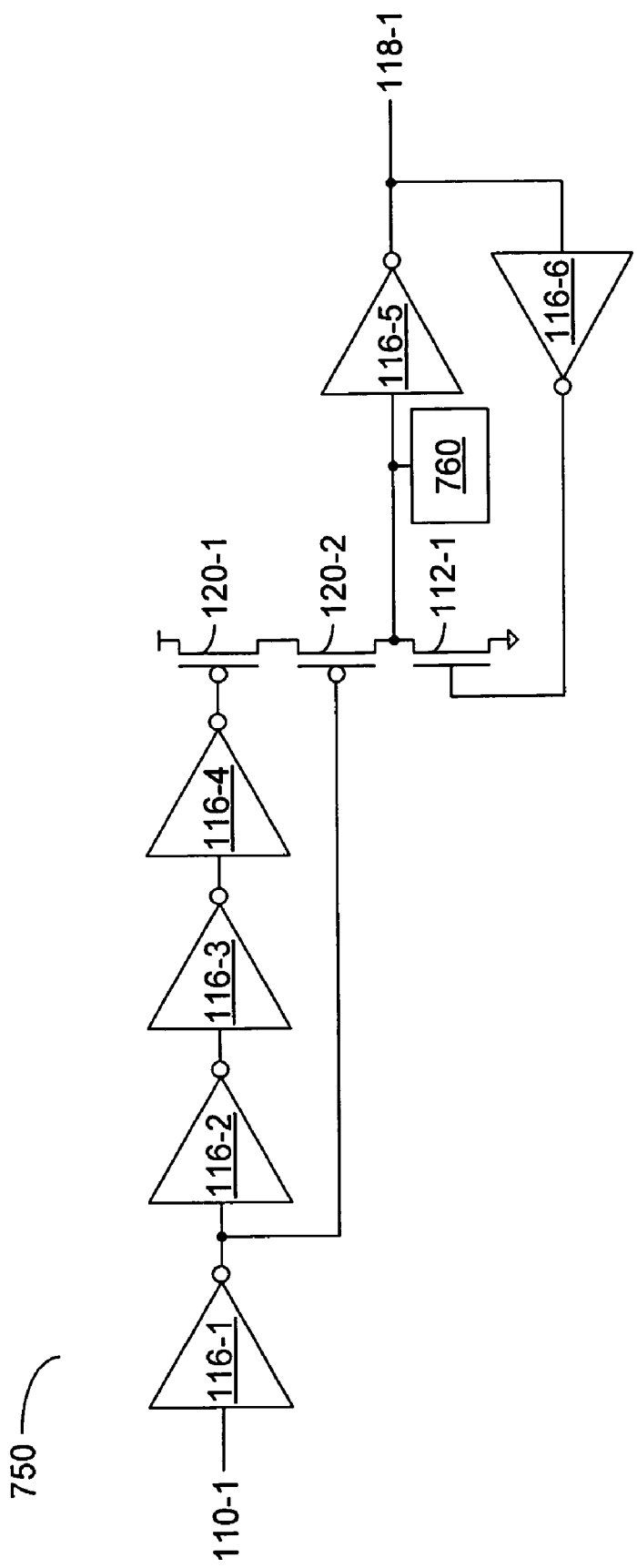
FIG. 7C is a block diagram illustrating an embodiment of a circuit that converts between rising transition signals and positive pulse signals.
Figure 7D:
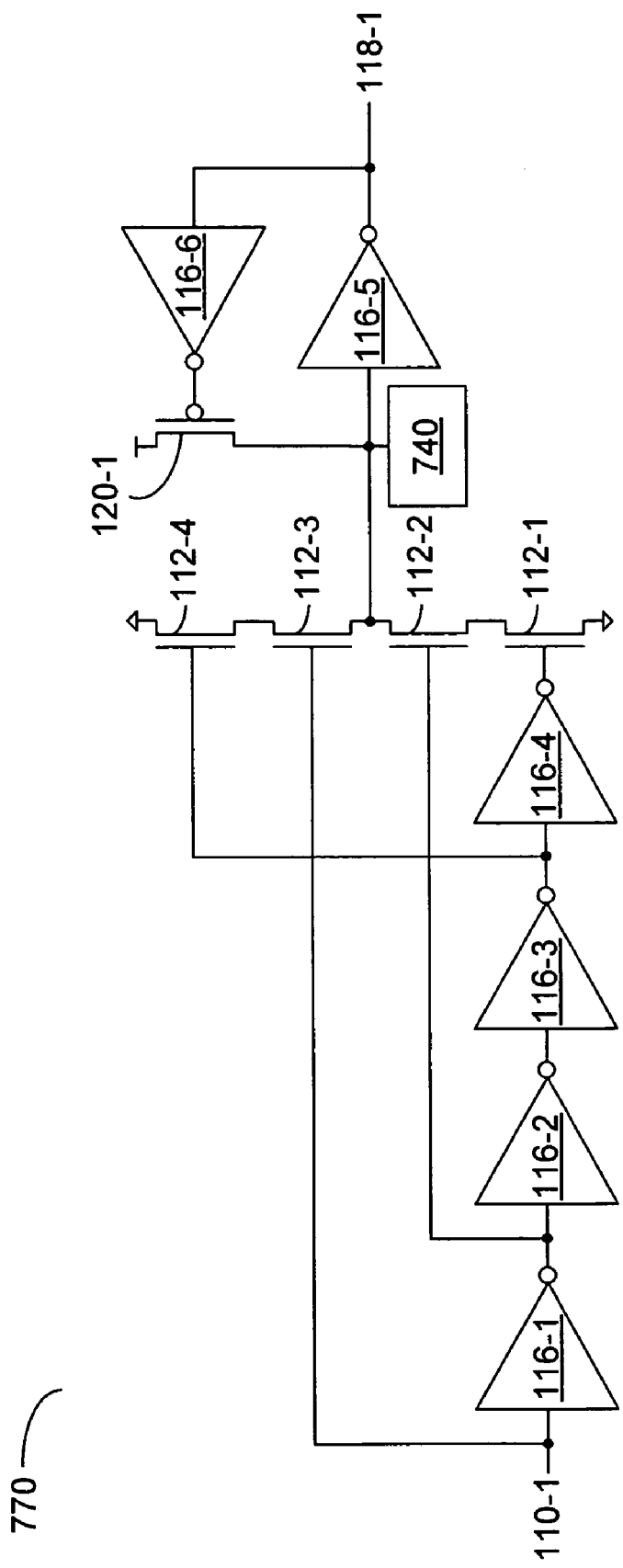
FIG. 7D is a block diagram illustrating an embodiment of a circuit that converts between any transition signals and positive pulse signals.

FIG. 6B provides a block diagram illustrating an embodiment 630 of a pipeline stage that includes 4-by-1 pulse Decision-Wait circuits 642 and pulse Merge circuits 644, and which utilizes a 2-phase protocol. These components form a 1-stage pipeline that is delay insensitive and utilizes 1-out-of-4 encoding on inputs 640 and outputs 646 to communicate 2 bits. However, in this case a pulse communicated on one wire encodes for one value out of four. The minimum cycle time of this pipeline stage includes the delay of two 4-by-1 pulse Decision-Wait circuits 642 and a pulse Merge (such as pulse Merge 644-2). For example, if each component has a forward latency of 2 gate delays then the minimum cycle time is six gate delays. This minimum cycle time satisfies the condition for minimum cycle times of pulse modules or circuits having loop delays of 3 gate delays. However, if the pulse circuits have loop delays equal to 5 gate delays, the minimum cycle time in the pipeline stage is at least 10 gate delays. In this case, at least two pulse repeater circuits are added somewhere in the pipeline circuit cycle.

The speed-energy (logical effort) and speed-area trade offs of various pulse-signaling implementations and level-signaling implementations were simulated for simple pipeline circuits. In this analysis, it was assumed that that long signal lines or wires couple the various stages of the pipeline. Furthermore, it was assumed that all gates in the circuits were sized for equal delay. The estimated energy consumption per cycle for a given minimum cycle time and the estimated total transistor width per stage for a given minimum cycle time were calculated. These simulations provide the trade-off curves for energy consumption versus cycle time and total transistor width versus cycle time. The trade-off curves indicate that negative pulse signaling implementations have better energy-speed trade off, followed by positive pulse signaling implementations, and then by transition signaling implementations. These results suggest that the cycle time for a given energy consumption or total transistor width for the negative pulse signaling implementations is almost a factor two better than the cycle time for the 4-phase transition signaling implementation.

We now describe circuits for converting from pulse signals to transition signals. Networks on chips may contain many long wires or signal lines, and pulse signals may degenerate over such connections. Pulse circuits, such as those described above, may tolerate small degenerations of input pulses because of the restoring properties of each pulse circuit. For long wires, however, the pulse signal degenerations and noise sensitivity may be too large. In order to communicate pulse signals over long wires, one may either use many pulse repeaters or one may switch to communicating transition signals. Communicating a transition signal over a long wire rather than a pulse signal may be more energy efficient because there is only one transition to communicate rather than two per event. The length of a wire for which it becomes more efficient to communicate a transition signal rather than a pulse signal depends on the process technology, the width of the pulse, the resistance and capacitance of the wire, and the cost of converting between pulses and transitions.

In experiments using 180 nm CMOS technology, a linear relationship was found between the pulse width of an output pulse on an output node and a maximum length of a wire of signal line between pulse circuit elements. Note that the pulse width of the output pulse corresponds to the duration of the delay of the feedback loop, and may be generated by varying the number of inverters in the feedback loop and/or by varying the gate delays in each inverter. For a wire width of 0.3 µm, an approximate resistance of 0.26 Ω/µm, and an approximate capacitance of 0.083 fF/µm, it was determined that a pulse circuit element can drive a wire having a length of around 1 mm with a pulse width of 160 ps. Furthermore, with a pulse width of around 350 ps, a pulse circuit element can drive a wire having a length of around 2.75 mm.

FIGS. 7A-7D provide block diagrams illustrating embodiments of circuits that convert between pulse signals and transition signals. One or more of these conversion circuits may be coupled to input nodes to and/or output nodes from pulse circuits in a network. Embodiment 700 illustrates an implementation that converts a positive input pulse on input node 710 to a transition on output node 716. The conversion uses a pulse latch 712 and an inverting feedback loop 714 with sufficient delay (such as a delay longer than the width of the input pulse).

Embodiment 730 illustrates an implementation that converts a rising transition to a positive pulse. Keeper 740 in this implementation may actually be a half keeper that keeps the internal node high. Furthermore, embodiment 750 illustrates an implementation that converts a rising transition to a negative pulse. Keeper 760 in this implementation may actually be a half keeper that keeps the internal node low. And embodiment 770 illustrates an implementation to convert any transition to a positive pulse. Once again, the keeper 740 in this implementation may actually be a half keeper that keeps the internal node high. Additional related embodiments for converting to and/or from different pulse and transition polarities may be implemented by one of skill in the art based on embodiments 700, 730, 750, and 770.

Figure 8:
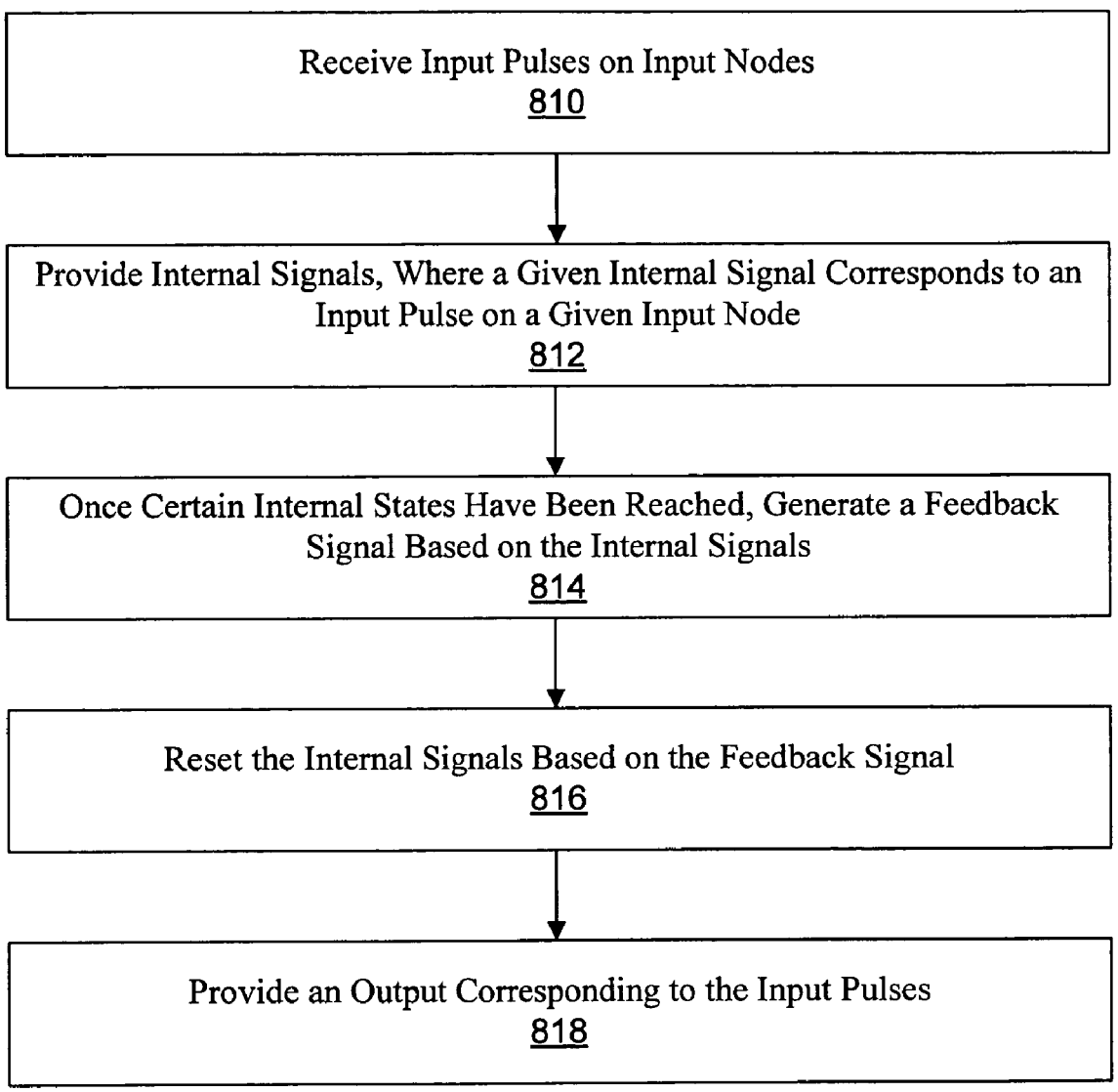
FIG. 8 is a flow chart illustrating an embodiment of a process for pulse signaling.

We now discuss methods for pulse signaling. FIG. 8 presents a flow chart illustrating an embodiment 800 of a process for pulse signaling. During this process, input pulses are received on input nodes (810) and internal signals are provided (812). Note that a given internal signal corresponds to an input pulse on a given input node. Once certain internal states are reached, a feedback signal is generated based on the internal signals (814) and the internal signals are reset based on the feedback signal (816). Furthermore, an output corresponding to the input pulses is provided (818). In some embodiments, there may be additional or fewer operations, the order of the operations may be changed, and two or more operations may be combined into a single operation.

Figure 9:
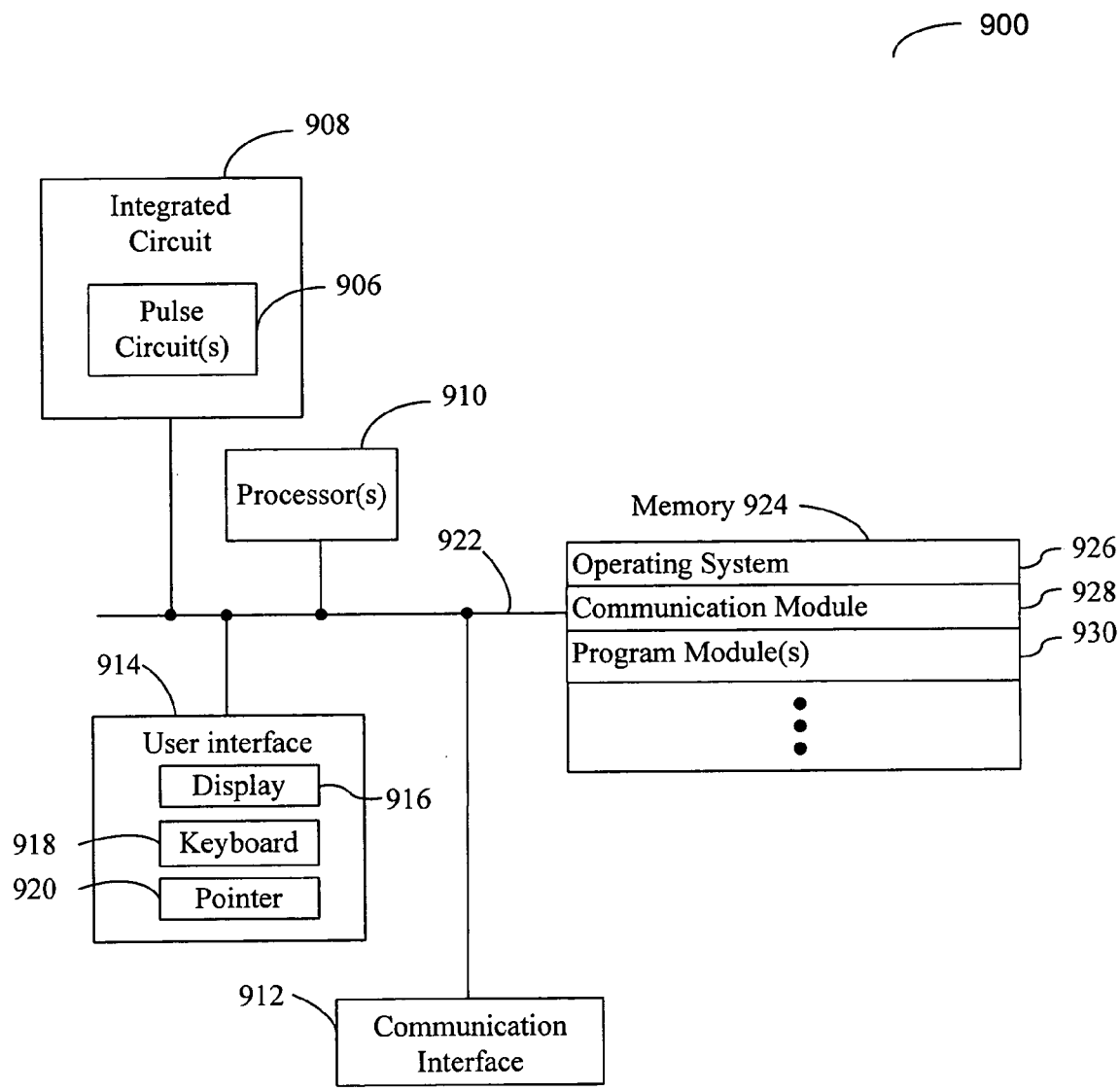
FIG. 9 is a block diagram illustrating an embodiment of a computer system.

The present invention may include systems that contain one or more integrated circuits that include pulse circuits. For example, FIG. 9 presents a block diagram illustrating an embodiment of a computer system 900, which includes one or more processors 910, a communication interface 912, a user interface 914, and one or more signal lines 922 coupling these components together. Note that the one or more processing units 910 may support parallel processing and/or multithreaded operation, the communication interface 912 may have a persistent communication connection, and the one or more signal lines 922 may constitute a communication bus. Moreover, the user interface 914 may include a display 916, a keyboard 918, and/or a pointer 920, such as a mouse.

The computer system 900 may include memory 924, which may include high speed random access memory and/or nonvolatile memory. More specifically, memory 924 may include ROM, RAM, EPROM, EEPROM, FLASH, one or more smart cards, one or more magnetic disc storage devices, and/or one or more optical storage devices. Memory 924 may store an operating system 926, such as SOLARIS, LINUX, UNIX, OS X, or WINDOWS, that includes procedures (or a set of instructions) for handling various basic system services for performing hardware dependent tasks. The memory 924 may also store procedures (or a set of instructions) in a communication module 928. The communication procedures may be used for communicating with one or more computers and/or servers, including computers and/or servers that are remotely located with respect to the computer system 900.

Memory 924 may also include the one or more program modules (of sets of instructions) 930. Instructions in the program modules 930 in the memory 924 may be implemented in a high-level procedural language, an object-oriented programming language, and/or in an assembly or machine language. The programming language may be compiled or interpreted, i.e, configurable or configured to be executed by the one or more processing units 910.

The computer system 900 may include one or more integrated circuits 908 that include one or more pulse circuits 906 as described in the previous embodiments.

The computer system 900 may include fewer components or additional components, two or more components may be combined into a single component, and/or a position of one or more components may be changed. In some embodiments, the functionality of the computer system 900 may be implemented more in hardware and less in software, or less in hardware and more in software, as is known in the art.

Although the computer system 900 is illustrated as having a number of discrete items, FIG. 9 is intended to be a functional description of the various features that may be present in the computer system 900 rather than as a structural schematic of the embodiments described herein. In practice, and as recognized by those of ordinary skill in the art, the functions of the computer system 900 may be distributed over a large number of servers or computers, with various groups of the servers or computers performing particular subsets of the functions. In some embodiments, some or all of the functionality of the computer system 900 may be implemented in one or more application specific integrated circuits (ASICs) and/or one or more digital signal processors (DSPs).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A pulse circuit, comprising:

an input stage configured to receive input pulses on input nodes using push-pull elements, wherein a given push-pull element is configured to receive an input pulse on a given input node and to provide a corresponding internal signal; and a feedback loop including a logic element coupled between outputs from the push-pull elements and reset nodes of the push-pull elements, wherein the logic element is configured to provide one or more outputs from the pulse circuit and to reset the internal signals from the push-pull elements via the feedback loop;

wherein a delay associated with the feedback loop and one of the push-pull elements has a pre-determined value; and wherein the delay is at least as large as a width of the input pulses.

2. The pulse circuit of claim 1, further comprising keeper circuits coupled to the push-pull elements, wherein a given keeper circuit maintains the internal signal from the given push-pull element.

3. The pulse circuit of claim 1, wherein the feedback loop further includes an inverter.

4. The pulse circuit of claim 1, wherein the feedback loop further includes additional cascaded logic elements.

5. The pulse circuit of claim 1, wherein the given push-pull element includes a PMOS transistor and an NMOS transistor.

6. The pulse circuit of claim 1, wherein the input stage is configured to receive the input pulses on the input nodes at different times.

7. The pulse circuit of claim 1, wherein the input pulses include negative pulses.

8. The pulse circuit of claim 1, wherein a minimum time separation between input pulses on the given input node is at least as large as twice a pre-determined delay associated with the feedback loop and one of the push-pull elements.

9. The pulse circuit of claim 1, further comprising a configuration circuit, which is configured to initialize the internal signals from the push-pull elements.

10. The pulse circuit of claim 1, further comprising a pulse-to-transition converter circuit coupled to the logic element.

11. The pulse circuit of claim 1, wherein the pulse circuit is included in a pipeline circuit.

12. The pulse circuit of claim 1, wherein the pulse circuit is included in an arithmetic logic circuit.

13. The pulse circuit of claim 1, wherein the pulse circuit is included in a switching circuit.

14. The pulse circuit of claim 1, wherein the input nodes include a control node and two signal nodes, and wherein the input stage is configured to receive a control input pulse on the control node and a signal input pulse on either of the two signal nodes.

15. The pulse circuit of claim 14 wherein the input stage is configured to receive the control input pulse and the signal input pulse at different times.

16. The pulse circuit of claim 1, wherein the input nodes include a first set of n inputs and a second set of m inputs, and there are m-by-n output nodes from the pulse circuit;

wherein a respective output node corresponds to a combination of a first input from the first set of n inputs and a second input from the second set of m inputs; and wherein the pulse circuit is configured to provide an output on a corresponding output node in response to receipt of a first input pulse on the first input and a second input pulse on the second input.

17. A computer system, comprising:

a processor;

a memory; and an integrated circuit including a pulse circuit, wherein the pulse circuit comprises:

an input stage configured to receive input pulses on input nodes using push-pull elements, wherein a given push-pull element is configured to receive an input pulse on a given input node and to provide a corresponding internal signal; and a feedback loop including a logic element coupled between outputs from the push-pull elements and reset nodes of the push-pull elements, wherein the logic element is configured to provide one or more outputs from the pulse circuit and to reset the internal signals from the push-pull elements via the feedback loop, wherein a delay associated with the feedback loop and one of the push-pull elements has a pre-determined value and wherein the delay is at least as large as a width of the input pulses.

18. A method for pulse signaling, comprising:

receiving input pulses on input nodes;

providing internal signals, wherein a given internal signal corresponds to an input pulse on a give input node;

generating a feedback signal based on the internal signals;

resetting the internal signals based on the feedback signal; and providing an output corresponding to the input pulses;

wherein a delay associated with the feedback signal and one of the input nodes has a pre-determined value; and wherein the delay is at least as large as a width of the input pulses.

\* \* \* \* \*